United States Patent
Goergen et al.

(10) Patent No.: US 8,399,373 B2
(45) Date of Patent: Mar. 19, 2013

(54) ZEOLITIC CATALYSTS, THEIR PROCESS FOR PREPARATION AND THEIR APPLICATIONS

(75) Inventors: Simone Goergen, Lyons (FR); Loic Rouleau, Charly (FR); Emmanuelle Guillon, Vernaison (FR); Florent Guillou, Lyons (FR); Laurent Simon, Villeurbanne (FR); Christophe Bouchy, Lyons (FR); Joël Patarin, Flaxlanden (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 498 days.

(21) Appl. No.: 12/541,540

(22) Filed: Aug. 14, 2009

(65) Prior Publication Data

US 2010/0179361 A1 Jul. 15, 2010

(30) Foreign Application Priority Data

Aug. 14, 2008 (FR) ..................................... 08 04608

(51) Int. Cl.
*C07C 5/22* (2006.01)
*B01J 29/06* (2006.01)
*C10G 47/02* (2006.01)

(52) U.S. Cl. ................ 502/60; 502/61; 502/63; 502/64; 502/73; 208/110; 585/481

(58) Field of Classification Search ............ 502/60, 502/61, 63, 64, 73; 585/481; 208/110
See application file for complete search history.

(56) References Cited

U.S. PATENT DOCUMENTS 4,800,187 A    1/1989   Lachman et al.

FOREIGN PATENT DOCUMENTS

EP    1 222 961 A2    7/2002
WO    WO 99/16709    4/1999

OTHER PUBLICATIONS

"International Search Report," International Application No. FR 0804608, Date of mailing Mar. 16, 2009, 2 pages.
"Landau M. V. et al.," "Silica-supported small crystals of ZSM-5 zeolite," Applied Catalysis A: General, vol. 115, No. 1,4 août 1994, pp. L7-L14, XP002518365, Elsevier Science Publishers B.V.
"Alshevani A et al." "Nanocomposite MFI-Ceramic hollow fibres: Prospects for C02 separation," Microporous and Mesoporous Materials, Elsevier Science Publishing, New York, US, vol. 115, No. 1-2, Feb. 21, 2008, pp. 197-205, XP023521079, ISSN: 1387-1811.

*Primary Examiner* — Elizabeth Wood
(74) *Attorney, Agent, or Firm* — Millen, White, Zelano & Branigan, P.C.

(57) ABSTRACT

The invention describes a porous composite material that comprises a porous substrate based on a refractory inorganic oxide in which said substrate has a zeolite crystal content that is less than 25% by mass, whereby said crystals are dispersed homogeneously in the pores of said substrate, and the distribution coefficient that is measured by Castaing microprobe is between 0.75 and 1.25, and in which the total pore volume of said substrate represents at least 40% of the initial total pore volume of the substrate, and the mean diameter of the pores represents at least 50% of the mean diameter of the pores of the initial substrate, its process for preparation and its use as catalyst in the hydrocarbon feedstock conversion reactions.

16 Claims, 2 Drawing Sheets

ZEOLITIC CATALYSTS, THEIR PROCESS FOR PREPARATION AND THEIR APPLICATIONS

TECHNICAL FIELD

This invention relates to the field for preparation of a porous composite material that comprises a porous substrate based on one or more refractory inorganic oxides and a zeolite crystal content that is less than 25% by mass dispersed homogeneously in the pores of this substrate. The invention also relates to the applications of said porous composite material as a catalyst or catalyst substrate in hydrocarbon conversion reactions. More specifically, the preparation of said porous composite material according to the invention uses the crystallization of a zeolite among pores of a substrate. The crystallization is carried out after impregnation stages and operation drying stages, during a hydrothermal treatment. The preparation conditions make it possible to obtain a homogeneous dispersion of zeolite crystals in the pores of the substrate. By Castaing microprobe, a distribution coefficient of the framework elements X and Y of the zeolite is measured within the composite material, which is between 0.75 and 1.25. X represents silicon and/or germanium, and Y represents at least one element that is selected from among aluminum, iron, gallium, and boron. The preparation conditions also make it possible to preserve at least 40% of the initial pore volume and at least 50% of the initial mean diameter of the pores of the substrate.

PRIOR ART

A zeolite is an oxide that has a three-dimensional structure that results from the chain of tetrahedral units leading to a network of molecular dimension channels, with a pore diameter varying from 3 to 10 Å (Ch. Baerlocher, L. B. McCusker, D. H. Olson, Atlas of Zeolites Framework Types, 6$^{th}$ Edition, Elsevier, 2007). A zeolite is typically a silicoaluminate and is currently extended to other compositions that lead to a uniform three-dimensional structure in particular with metallosilicates, such as, for example, aluminosilicates, borosilicates, ferrosilicates, titanosilicates, with metallophosphates, such as, for example, aluminophosphates, gallophosphates, and silicoaluminophosphates, and with metallogerminates, etc.

The zeolites are generally synthesized by carrying—under hydrothermal conditions at a temperature set between 50 and 250° C., for a duration varying from several hours to several days, under autogenous pressure—a mixture of precursors containing sources of the framework elements, whereby one or more mineralizing sources make it possible to put the framework elements into solution, one or more structuring sources promoting their zeolite organization and a solvent.

"Framework element" is defined as an element that will form the structural skeleton of the zeolite.

The zeolite crystals are typically recovered in the form of micronic or nanometric particles. To prepare porous composite materials that contain these zeolite crystals and that can be used in a hydrocarbon conversion reaction, additional stages for mixing and shaping are necessary. The zeolite crystals that are obtained from the crystallization of a mixture of precursors under hydrothermal conditions are typically mixed with a binder and put in the form of objects of defined size and geometry by using techniques that are known to one skilled in the art, such as extrusion, granulation, drying by spraying, etc. These additional stages of mixing and shaping make the preparation of porous composite materials quite complex and can affect the catalytic performance level that is unique to the zeolite.

The crystallization of the zeolite on the surface of a substrate is a synthesis method that is already known for the preparation of zeolitic catalysts or zeolitic separation membranes that are formed by a substrate that is coated with a zeolite layer. For example, a procedure that comprises a single stage has been published by hydrothermal treatment of a substrate that is immersed in a mixture of zeolite precursors (Van der Puil et al., Micropor. Mesopor. Mat. 27, 1999, 95; Davis et al., Chem. Mater. 2, 1990, 712). One of the drawbacks of this method is the difficulty of promoting the nucleation of the zeolite, i.e., the initiation of the crystallization of the zeolite on the surface of the substrate during the hydrothermal treatment. The result is significant losses of zeolite crystals in solution in the mixture of precursors, whereby these zeolite crystals are not attached to the surface of the substrate. A possible alternative for carrying out the nucleation of zeolite crystals on the surface of the substrate in a controlled manner is to use a technique that is known by one skilled in the art under the name of "Dry Gel Conversion" or "Vapor Phase Transport" according to the English terminology or also called "la conversion hydrothermal en phase gazeuse [gas-phase hydrothermal conversion]," (Matsufuji, J. Membr. Sci., 178, 2000, 25, Wang et al., Appl. Catal. B-Environ, 32, 2001, 205). The synthesis is then carried out in two stages. A compact layer of the precursor mixture is deposited on the surface of the substrate, and then the hydrothermal treatment is carried out in the presence of a vapor that is saturated with water or with a volatile organic structuring agent that is obtained from the bottom of the autoclave. Because of the presence of the precursor mixture inside the pores of the substrate, this approach makes it possible to maximize the quantity of zeolite that is deposited on the surface of the substrate.

Another possible alternative is to take a porous substrate and to synthesize the zeolite directly in the pores of this substrate.

The formation of a zeolite in the pores of a substrate is only known for the preparation of zeolitic separation membranes, where the zeolite is primarily deposited in the pores of a substrate that forms a continuous zeolite/substrate composite layer without any intercrystalline porosity (Giroir-Fendler et al., Stud. Surf. Catal., 101A, 1996, 127). The hydrothermal treatment is then carried out by immersion in a mixture of liquid precursors that are not very viscous and that contain only amorphous particles of a size that is smaller than the pore diameter. The crystallization is initiated inside the pores that are filled with the precursor mixture. The immersion of the substrate in the precursor mixture ensures a constant supply of framework elements that is necessary for the growth of the zeolite until the entire pore volume is filled.

The object of the invention is therefore the development of porous composite materials that comprise a porous substrate with a low zeolite content whose crystals are dispersed homogeneously in the pores of the substrate. This new porous composite material can advantageously be used as a catalyst or a catalyst substrate in the hydrocarbon feedstock conversion and offers advantages relative to a porous composite catalyst that is prepared by shaping.

SUMMARY AND ADVANTAGE OF THE INVENTION

This invention has as its object a porous composite material that comprises a porous substrate that is based on a refractory inorganic oxide in which said substrate has a zeolite crystal content that is less than 25% by mass, whereby said crystals are dispersed homogeneously in the pores of said substrate, the distribution coefficient of the framework elements X and Y of the zeolite, where X represents silicon and/or germanium, and Y represents at least one element that is selected from among aluminum, iron, gallium, and boron, measured by Castaing microprobe that is between 0.75 and 1.25, and in which the total pore volume of said substrate represents at least 40% of the initial total pore volume of the substrate, and the mean diameter of the pores represents at least 50% of the mean diameter of the pores of the initial substrate.

This invention also has as its object a process for preparation of said porous composite material that comprises at least the following stages:

1) The impregnation of a porous substrate based on a refractory inorganic oxide with a mixture of zeolitic precursors comprising one or more sources of framework elements X and Y, where X represents silicon and/or germanium, and Y represents at least one element that is selected from among aluminum, iron, gallium, or boron, as well as the sources of a mineralizing agent and a structuring agent, until the pore volume of the impregnated and anhydrous substrate represents at least 40% of the initial pore volume of the substrate, and the mean diameter of the pores is at least 50% of the mean diameter of the pores of the initial substrate.

2) Hydrothermal treatment of the impregnated substrate that is obtained from stage 1) that makes possible the crystallization of the zeolite in the pores of said substrate, without an additional supply of said framework elements X and Y.

This invention also has as its object the use of said porous composite material as a catalyst in the hydrocarbon feedstock conversion reactions.

One advantage of the invention is that the zeolite crystals are located primarily in the pores of the substrate, while preserving a portion of the pore volume of the substrate, whereby the substrate contains only a small content of zeolite and whereby the crystals are dispersed very homogeneously in the pores of said substrate.

Another advantage of the invention is that said porous composite material offers improved performances in a process for conversion of a hydrocarbon feedstock relative to the catalysts that are known by one skilled in the art.

DISCLOSURE OF THE INVENTION

According to the invention, the porous composite material comprises a porous substrate based on a refractory inorganic oxide in which said substrate has a zeolite crystal content that is less than 25% by mass, preferably less than 20% by mass, and very preferably less than 15% by mass, whereby said crystals are dispersed homogeneously in the pores of said substrate, the distribution coefficient of the framework elements X and Y of the zeolite, where X represents silicon and/or germanium, and Y represents at least one element that is selected from among aluminum, iron, gallium, or boron, measured by Castaing microprobe between 0.75 and 1.25, preferably between 0.85 and 1.15, and very preferably between 0.95 and 1.05, and in which the total pore volume of said substrate represents at least 40% of the initial total pore volume of the substrate, preferably at least 60% and very preferably at least 70% of the initial total pore volume of the substrate, and the mean diameter of the pores represents at least 50% of the mean diameter of the pores of the initial substrate, preferably at least 60%, and very preferably at least 70% of the mean diameter of the pores of the initial substrate.

The crystalline phase of one or more refractory oxides that compose the substrate and more particularly the crystalline phase that corresponds to the zeolite is generally demonstrated by an x-ray diffraction analysis. The crystalline phase of the zeolite in general can be detected by this method of analysis if its content is greater than 5%. The zeolite content of the final material is evaluated by a nitrogen physisorption analysis that is known to one skilled in the art, making it possible to quantify the volume of micropores, having a diameter that is less than 2 nm. Nitrogen adsorption isotherms are recorded by measuring the volume of nitrogen that is adsorbed based on a relative pressure $p/p°$. The micropore volume is estimated by the t-plot method according to Boer (Lippens, B. C., de Boer, J. H., Journal of Catalysis, 1965, 4, 319) by assuming that in certain regions of the isotherm, the micropores are filled, whereas in the adsorption in the pores that have a diameter of greater than 2 nm, the adsorption continues in a linear manner.

According to the invention, the total pore volume of the final porous composite material that corresponds to pores that have a diameter of more than 2 nm is at least 40%, preferably at least 60%, and very preferably at least 70% of the initial total pore volume of the porous substrate, and the mean diameter of the pores of the porous composite material is at least 50%, preferably at least 60%, and very preferably at least 70% of the mean diameter of the pores of the initial substrate. These characteristics are close to those that are determined after the impregnations of stage 1) of the process and the evaporation of the solvent. These characteristics are evaluated by mercury porosimetry analyses (J. Charpin, B. Rasneur, Techniques de l'ingénieur, traité analyses et caractérisation [Engineering Techniques, Analytical Treatise and Characterization], 1050, ASTM Standard D4284-83). This method is based on the gradual intrusion of mercury in the porous system of previously evacuated material. A volume that is based on applied pressure is measured. The diameter of the pores in which the mercury has penetrated is calculated using the equation $r=2·\gamma·\cos\theta/p$, where r is the diameter of the pores (m), $\gamma$ is the surface tension ($N·m^{-1}$), $\theta$ is the angle of contact between mercury and the wall of the pores (radian), and p is the applied pressure ($N·m^2$). To determine the pore volume and the mean diameter of the pores of the impregnated substrate that is obtained from stage 1) of the process, the impregnated solvent first is to be evaporated.

According to the invention, the zeolite is dispersed homogeneously into the pores of said substrate. This dispersion can be determined qualitatively using the Castaing microprobe by measuring the intensities of X-radiation of a framework element X or Y, where X represents silicon and/or germanium, and Y represents at least one element that is selected from among aluminum, iron, gallium, and boron. Preferably, X is silicon, and Y is aluminum. This analysis is possible only if at least one of the elements X and Y is not contained in the crystalline structure of the substrate. A distribution coefficient of these elements X or Y that corresponds to the ratio between the mean concentration and the weighted $r^2$ concentration, r being the radius that parameterizes the position of the analysis point on the substrate, is determined. If the distribution coefficient is less than one, the element is distributed in a dish or a bowl. A unit coefficient reflects a flat distribution of the element, and a coefficient that is greater than one indicates a humped distribution profile. According to the invention, the distribution coefficient that is measured by Castaing microprobe is at least between 0.75 and 1.25, preferably between 0.85 and 1.15, and very preferably between 0.95 and 1.05.

The size and the morphology of the zeolite crystals are generally characterized by analyses of scanning electron microscopy and transmission electron microscopy. If the size of the zeolite particles is greater than 1 µm, these particles can be visualized using chemical contrast by analysis with a scanning electron microscope carried out on a polished section of porous composite material (FIGS. 1 to 2). If the size of the crystals is smaller than 1 µm, the chemical contrast of the composite material is uniform over the entire section of the porous composite material.

If the substrate that is used to form the porous composite material is constituted by the arrangement of micrograins generating an intergranular porosity, as is the case according to the invention, said porous composite material can generally have two morphologies according to the size of the zeolitic particles that are formed. If the size of the zeolitic particles is less than the diameter of the pores of the initial substrate, these particles are generally composed entirely of zeolite and are located in the available space between the micrograins that compose the substrate. If the size of the zeolite particles is greater than the diameter of the pores of the initial substrate, the zeolite generally crystallizes around micrograins that compose the substrate to form zeolite crystal/substrate grains composite agglomerates. An analysis by X mapping carried out on a zeolitic particle that is located in the core of the porous composite material generally makes it possible to visualize the micrograins of the substrate within the composite agglomerates.

According to the invention, the substrate that is used to form the composite material is formed, but without being limited, by one or more refractory inorganic oxides. The refractory inorganic oxides are preferably selected from among alpha-alumina, theta-alumina, cordierite, magnesium oxide, zirconia, titanium oxide or mixtures of these oxides, and very preferably, the refractory inorganic oxide is alpha-alumina.

Said porous substrate advantageously can come in different forms, such as, for example, in the form of extrudates, granules, balls, irregular shapes, including tubular shapes and/or multichannel monoliths and/or fibers. Preferably, the substrate comes in the form of balls.

In the case of a multilayer substrate with variable pore diameters, the values that relate to the total pore volume and the diameter of the pores of the substrate of the composite material relate only to the small layer of pores, where the zeolite will be primarily formed.

Said porous substrate can have different sizes. In the case of balls, the substrate has a mean size of between 30 µm and 10 mm, preferably between 50 µm and 7 mm, and very preferably between 75 µm and 5 mm. Said substrate advantageously has an ordered or unordered pore system, composed of mesopores and/or macropores, i.e., with a mean diameter of pores advantageously between 2 nm and 1,000 nm, preferably between 20 nm and 750 nm, and very preferably between 50 nm and 500 nm, and a pore volume that is advantageously between 0.05 and 2 mL·g$^{-1}$, and preferably between 0.1 and 1.5 mL·g$^{-1}$, and very preferably between 0.3 and 1.5 mL·g$^{-1}$.

According to the invention, said porous composite material is prepared according to a process for preparation that comprises at least the following stages:

1) The impregnation of a porous substrate based on a refractory inorganic oxide with a mixture of zeolitic precursors comprising one or more sources of framework elements X and Y, where X represents silicon and/or germanium, and Y represents at least one element that is selected from among aluminum, iron, gallium, or boron, as well as a mineralizing agent and a structuring agent, until the pore volume of the impregnated and anhydrous substrate represents at least 40% of the initial pore volume of the substrate, and the mean diameter of the pores is at least 50% of the mean diameter of the pores of the initial substrate.

2) Hydrothermal treatment of the impregnated substrate that is obtained from stage 1) that makes possible the crystallization of the zeolite in the pores of said substrate, without an additional supply of said framework elements X and Y. According to stage 1) of the process for preparation of the composite material, the substrate is impregnated with the reagents that are necessary to the formation of a zeolite, i.e., with one or more sources of the framework elements X and Y, where X represents silicon and/or germanium, and Y represents at least one element that is selected from among aluminum, iron, gallium, and boron, as well as the sources of a mineralizing agent and a structuring agent and optionally a solvent that is advantageously distilled water. These different reagents are advantageously impregnated separately or in the form of a mixture of two or more of these reagents. Preferably, the sources of the elements X and Y are impregnated separately.

Said mineralizing agent is advantageously selected from among the hydroxide ion and the fluoride ion and preferably said mineralizing agent is the hydroxide ion.

Said structuring agent is advantageously a cation M and/or an organic compound Q that makes possible the formation of a zeolite, whereby said compounds M and/or Q can advantageously be present as salts, for example in the form of hydroxides, halides, sulfates, silicates or aluminates.

In the case where said structuring agent is an organic compound Q, said organic structuring agent is advantageously any organic compound that contains at least one element of the group VA of the periodic table, and preferably nitrogen, phosphorus, arsenic, antimony, and very preferably nitrogen or phosphorus, and even more preferably nitrogen. Said organic structuring agent can also advantageously contain at least one alkylene, alkyl or aryl group that comprises 1 to 8 carbon atoms. The particularly preferred organic structuring agents that contain nitrogen are advantageously amines and quaternary ammonium cations. The latter are generally represented by the formula $R_4N^+$ where R is an alkyl or aryl group that comprises 1 to 8 carbon atoms. Polymer quaternary ammonium salts of formula $[(C_{14}H_{32}N_2)(OH)_2]_x$, where x is at least equal to 2, can advantageously be used. Mono-, di- or triamines are advantageously used by themselves or combined with a quaternary ammonium compound.

Examples of organic structuring agents are, without being limited thereto, the following cations: tetramethylammonium, tetraethylammonium, tetra-n-propylammonium, tetraisopropylammonium, tetrabutylammonium, diethylammonium, triethylammonium, dibenzylammonium, dibenzyldimethylammonium, dibenzyldiethylammonium, benzyltrimethylammonium and 2-(hydroxylalkyl)-trialkylammonium, where the alkyl group is methyl, ethyl, or a combination of the two, an alkyl derivative of an α-ω diammonium polymethylene, trimethylamine, triethylamine, tri-n-propylamine, ethylenediamine, propanediamine, butanediamine, pentanediamine, hexanediamine, methylamine, ethylamine, propylamine, isopropylamine, butylamine, t-butylamine, dimethylamine, diethylamine, di-n-propylamine, di-n-butylamine, di-n-pentylamine, benzylamine, aniline, pyridine, piperidine and pyrrolidine, triethanolamine, quinuclidine, methyl-quinuclidine hydroxide, cyclohexylamine, neopentylamines, N,N-dimethylbenzylamine, ethylenediamine, hexamethylenediamine, pyrrolidine, 2-imidazolidone, piperidine, 2-methylpyridine, N,N'-dimethylpiperazine, N-methyldiethanolamine, N-methylethanolamine, N-methylpiperidine, 3-methylpiperidine, N-methylcyclohexylamine, 3-methylpyridine, 4-methylpyridine, diethylpiperidinium, trimethylbenzylammonium, tetraethylphosphonium, 5-azoniaspiro(4,4)nonane or bispyrrolidinium, (2-hydroxyethyl)trimethylammonium, 1,4-dimethyl-1,4-diazoniabicyclo(2,2,2)octane, 1,4-diazoniabicyclo(2,2,2)octane, and N,N'-dimethyl-1,4-diazabicyclo(2,2,2)octane. According to the methods that are known to one skilled in the art, a given organic structuring agent can direct the formation of several types of zeolites, and one type of given zeolite can be formed using several different organic structuring agents.

The impregnation is advantageously carried out at ambient temperature or under cold conditions. For a cold impregnation, the impregnation temperature is then advantageously between −10° C. and 20° C., preferably between −5° C. and 10° C., and even more preferably between 0° C. and 5° C. The cold impregnation is preferred over the impregnation at ambient temperature if the mixture of all of the reagents has gelled, is not liquid, and is too viscous at ambient temperature to enter the pores of the substrate. Cooling actually makes it possible to slow the condensation reactions and to prevent the formation of an amorphous and viscous gel.

According to a method that is known to one skilled in the art, the reagent or the mixture of reagents is to form a fluid solution that contains only amorphous particles of a size that is smaller than the diameter of the pores of the porous substrate. The mixtures of precursors of a zeolite that satisfy these conditions are known by one skilled in the art under the name of "clear solutions" (L. Tosheva, V. Valtchev, Chem. Mater. 2005, 17, 2424-2513).

Impregnation is advantageously carried out by all of the methods that are known by one skilled in the art, in particular by dry impregnation or excess impregnation. It is advantageously carried out in one or more stages until all of the necessary reagents are impregnated. Between the different impregnation stages, a drying of said impregnated porous substrate that is obtained from stage 1) is advantageously used to evaporate the solvent and to release the pore volume for the following impregnation. This drying is advantageously carried out at a temperature of less than 200° C. and preferably less than 120° C. and very preferably less than 100° C.

This drying can also be advantageously carried out before initiating analyses by mercury porosimetry to determine the volume and the diameter of pores of the porous substrate that is impregnated at the end of stage 1) of the preparation process. According to the invention, a total pore volume of the impregnated porous substrate is then measured that is at least 40%, preferably at least 60%, and very preferably at least 70% of the initial total pore volume of the porous substrate, and the mean diameter of the pores is at least 50%, preferably at least 60%, and very preferably at least 70% of the mean diameter of the pores of the initial porous substrate.

The zeolites that can be crystallized in the pores of a porous substrate according to the invention are advantageously all synthetic zeolites. These zeolites and their related solids are described in "Atlas of Zeolite Framework Types," eds. Ch. Baerlocher, L. B. Cusker, D. H. Olson, 6$^{th}$ Edition, Elsevier, 2007, that we are citing here as a reference. The zeolites that are used in the preparation process according to this invention are selected from among the beta-zeolite of the BEA-structural type, the EU-1 zeolite of the EUO-structural type, the EU-2 zeolite, the NaX and NaY zeolites of the FAU-structural type, the ZSM-5 zeolite of the MFI-structural type, and the ZSM-22 zeolite of the TON-structural type.

The selection of the reagents for impregnating a porous substrate according to stage 1) of the preparation process and the molar compositions of the mixture of impregnated precursors (apart from the substrate) at the end of stage 1) of the preparation process—and starting from which these zeolites crystallize—are well known by one skilled in the art.

The source of the element X, where X represents silicon and/or germanium, advantageously can be any compound that comprises the element X and can release this element into aqueous solution in reactive form. According to the preferred embodiment in which the element X is silicon, the silicon source can be any of those commonly used in the synthesis of zeolites, for example the solid silica in powder form, silicic acid, colloidal silica, dissolved silica, or an alkoxysilane such as tetraethoxysilane (TEOS). It is also possible to use mixtures of the sources cited above. Among the silicas in powder form, it is possible to use precipitated silicas, in particular those that are obtained by precipitation from an alkaline metal silicate solution, pyrogenated silicas, for example "Aerosil," or silica gels. The colloidal silicas that can be used can have variable particle sizes, for example particles with a mean equivalent diameter of between 10 and 15 nm or between 40 and 50 nm, such as those that are marketed under the filed trademark "LUDOX."

A portion of the sources of elements X and/or Y can be obtained from the reactivity of the substrate during the hydrothermal treatment.

The source of the element Y, where Y represents at least one element that is selected from among aluminum, iron, gallium, or boron, advantageously can be any compound that comprises the element Y and can release this element in aqueous solution in reactive form. According to the preferred embodiment in which Y is aluminum, the aluminum source is preferably sodium aluminate, or an aluminum salt, for example chloride, nitrate, hydroxide or sulfate, an aluminum alkoxide or alumina itself, preferably in hydrated or hydratable form, such as, for example, the colloidal alumina, pseudoboehmite, gamma-alumina or alpha- or beta-trihydrate. It is also possible to use mixtures of the sources that are cited above.

A mineralizing agent is the hydroxide ion or the fluoride ion and preferably the hydroxide ion. A structuring agent can be a cation M and/or an organic compound Q.

M and/or Q can advantageously be present as salts, for example in the form of hydroxides, halides, sulfates, silicates or aluminates.

The solvent can be any compound that can evaporate at a temperature that is less than 200° C., preferably less than 120° C., and very preferably less than 100° C. This solvent can be water or an organic compound such as an alcohol, an amine, an organic acid, a polyol, or other compounds that are known to one skilled in the art. The solvent can also be a mixture of the compounds that are cited above. Preferably, the solvent is water.

The molar composition of the mixture of impregnated precursors (apart from the substrate) at the end of stage 1) of the preparation process depends on each type of zeolite, the composition and the reactivity of the substrate under the hydrothermal conditions that are used.

By way of example, we will cite the following preparations:

The preparation of the beta-zeolite of the BEA-structural type is described in the U.S. Pat. No. 3,308,069 that we are citing here as a reference. This zeolite is advantageously formed from a mixture of precursors having the following molar composition:

$XO_2/Y_2O_3$: 10 to 200
$OH^-/XO_2$: 0.1 to 1.2
$(M+Q)/Y_2O_3$: 1 to 240
$Q/(M+Q)$: 0.08 to 10
$H_2O/XO_2$: 2 to 75 where Q is preferably the tetraethylammonium hydroxide.

The preparation of the EU-1 zeolite of the EUO-structural type is described in the patent EP 0,042,226 B1 that we are citing here as a reference. This zeolite is advantageously formed from a mixture of precursors having the following molar composition:

$XO_2/Y_2O_3$: at least 10 and preferably 10 to 150
$OH^-/XO_2$: 0.1 to 6.0 and preferably 0.1 to 1.0
$(M+Q)/Y_2O_3$: 0.5 to 100
$Q/(M+Q)$: 0.1 to 1.0
$H_2O/XO_2$: 1 to 100 where Q is advantageously either the alkyl derivative of an α-ω diammonium polymethylene or a degradation product of said derivative, or else precursors of said derivative. Preferably, Q is the hexamethonium cation.

The preparation of the EU-2 zeolite is described in the patent GB 2,077,709 that we are citing here as a reference. This zeolite is advantageously formed from a mixture of precursors having the following molar composition:

$XO_2/Y_2O_3$: at least 70 and preferably at least 150
$OFF/XO_2$: 0.1 to 6.0 and preferably 0.1 to 1.0
$(M+Q)/Y_2O_3$: 0.5 to 100
$Q/(M+Q)$: 0.1 to 1.0
$H_2O/XO_2$: 1 to 100

Q is advantageously either the alkyl derivative of an α-ω diammonium polymethylene, or a degradation product of said derivative, or else precursors of said derivative. Preferably, Q is the hexamethonium cation.

The preparation of the NaX zeolite of the FAU-structural type is described in the U.S. Pat. No. 2,882,244 that we are citing here as a reference. This zeolite is advantageously formed from a mixture of precursors having the following molar composition:

$XO_2/Y_2O_3$: 3 to 5
$M_2O/XO_2$: 1.2 to 1.5
$H_2O/M_2O$: 35 to 60 where M is advantageously the sodium cation.

The preparation of the NaY zeolite of the FAU-structural type is described in the U.S. Pat. No. 3,130,007 that we are citing here as a reference. This zeolite is advantageously formed from a mixture of precursors having the following molar composition:

$XO_2/Y_2O_3$: 7 to 40
$M_2O/XO_2$: 0.2 to 2.1
$H_2O/M_2O$: 12 to 90 where M is advantageously the sodium cation.

The preparation of the ZSM-5 zeolite of the MFI-structural type is described in the U.S. Pat. No. 3,702,886 that we are citing here as a reference. This zeolite is advantageously formed from a mixture of precursors that has the following molar composition:

$XO_2/Y_2O_3$: 5 to 100 and preferably 10 to 60 and very preferably 10 to 40
$OH^-/XO_2$: 0.07 to 10 and preferably 0.1 to 0.8 and very preferably 0.2 to 0.75
$Q/(M+Q)$: 0.2 to 0.95 and preferably 0.3 to 0.9, and very preferably 0.4 to 0.9
$H_2O/XO_2$: 0.7 to 3,000 where Q is advantageously the tetrapropylammonium cation.

The preparation of the ZSM-22 zeolite of the TON-structural type is described in the U.S. Pat. No. 4,556,447 that we are citing here as a reference. This zeolite is advantageously formed from a mixture of precursors having the following molar composition:

$XO_2/Y_2O_3$: at least 20 and preferably 30 to 1,000
$Q/(M+Q)$: 0 to 0.95 and preferably 0.1 to 0.8 where Q is advantageously an ammonium or phosphonium cation that contains at least one alkyl or aryl group with at least 2 carbon atoms.

According to the invention, the impregnated substrate that is obtained from stage 1) of the preparation process according to the invention is then subjected to hydrothermal treatment according to stage 2) that makes possible the crystallization of the zeolite in the pores of said porous substrate without the external addition of said framework elements X and Y. The object is to convert the zeolite-impregnated mixture without supplying the reaction medium with said framework elements X and Y. A supply of the reaction medium with said elements X and Y could promote the growth of the zeolitic phase and increase the zeolite content in the pores that unfavorably reduce the volume and the size of the pores of the porous composite material.

The hydrothermal treatment according to stage 2) can be carried out according to two different procedures.

According to a first embodiment of said stage 2), the impregnated porous substrate that is obtained from stage 1) is immersed in a solvent, whereby said solvent is selected from among distilled water and an aqueous solution of an organic structuring agent Q or a cation M or an organic compound or a mixture of the latter. As organic solvent, it is advantageously possible to use an alcohol, an amine, an organic acid, a polyol or other solvents that are known to one skilled in the art. The solvent that contains the substrate is then advantageously transferred into an autoclave and is advantageously treated under autogenous pressure at a temperature of between 25 and 250° C. for 1 hour to several months.

According to a second embodiment of said stage 2), which is the preferred embodiment, the hydrothermal treatment is carried out according to the method that is known by one skilled in the art under the name of "Dry Gel Conversion," according to which said impregnated porous substrate that is obtained from said stage 1) is transferred into an autoclave. Said impregnated porous substrate that is obtained from stage 1) is then subjected to hydrothermal treatment under autogenous pressure at a temperature of between 25 and 250° C. for 1 hour to several months.

This hydrothermal treatment can also be carried out by introducing a liquid at the bottom of the autoclave. Said liquid can advantageously be distilled water or one or more volatile organic structuring agents Q or a mixture of the two. In the case where said stage 2) of the preparation process according to this invention takes place in the presence of a liquid in the bottom of the autoclave, said impregnated porous substrate that is obtained from stage 1) is not in contact with said liquid at the bottom of the autoclave.

At the end of said stage 2) of the preparation process according to the invention, the porous composite material that is obtained is advantageously in its crude synthesis form. It is advantageously recovered, washed, and then it is dried, preferably at a temperature of less than 200° C. and very preferably less than 120° C., and then it is optionally calcined. The calcination is advantageously carried out by methods that are known to one skilled in the art, for example under a flow of dry air to eliminate the organic structuring agent Q occluded in the micropores of the material. The calcination is advantageously carried out at a temperature of between 150° C. and 1000° C., more advantageously between 300° C. and 700° C., and even more advantageously between 400° C. and 650° C. for a period that is preferably between 1 hour and 40 hours and more preferably between 2 and 20 hours.

If the calcined porous composite material contains $M^+$ cations in the form of alkaline metal cations, at least one ion exchange stage is advantageously carried out, for example with at least one $NH_4NO_3$ solution, to eliminate at least a portion and preferably all of the cations of alkaline metals.

If the zeolite that is present in the porous composite material requires a dealuminification, in the preferred case where Y is Al, two dealuminification methods can be used. They are described below. Any other method that is known to one skilled in the art, however, is also within the framework of the invention. These methods that are described for aluminum (Al) can also be valid for the other elements Y.

The first so-called direct acid attack method comprises a stage for treatment by an aqueous solution of a mineral acid such as $HNO_3$ or HCl or an organic solution such as $CH_3CO_2H$. This last stage can be repeated as many times as necessary so as to obtain the desired level of dealuminification. It is possible to carry out one or more stages of dealuminification between two stages of ion exchange to eliminate at least a portion of the cations of alkaline metals $M^+$.

To reach the desired X/R ratio of the zeolite that is present in the porous composite material, it is necessary to select the operating conditions properly; from this standpoint, the most critical parameters are the temperature of the treatment by the aqueous acid solution, the concentration of the latter, its nature, the ratio between the quantity of acid solution and the mass of treated porous composite material, the duration of treatment, and the number of treatments carried out.

It is also possible to carry out dealuminification treatments by dealuminifying chemical compounds such as (by way of examples and non-exhaustively) silicon tetrachloride ($SiCl_4$), ammonium hexafluorosilicate [$(NH4)_2SiF_6$], ethylenediamine-tetraacetic acid (EDTA) as well as its mono- and disodium form. These reagents can be used in solution or in a gas phase, for example in the case of $SiCl_4$.

The second so-called heat treatment method (in particular with water vapor or "steaming") with acid attack comprises at least one framework dealuminification cycle, comprising at least one heat treatment that is carried out optionally and preferably in the presence of water vapor, at a temperature that is generally between 500 and 900° C., and optionally followed by at least one acid attack by an aqueous solution of a mineral or organic acid as defined above. The calcination conditions in the presence of water vapor (temperature, water vapor pressure, and duration of treatment) as well as the conditions of post-calcination acid attack (duration of the attack, concentration of the acid, nature of the acid that is used, and the ratio between the volume of acid and the zeolite mass) are adapted so as to obtain the desired level of dealuminification. For the same purpose, it is also possible to manipulate the number of heat treatment-acid attack cycles that are carried out.

One variant of this second method can consist in replacing the so-called acid attack stage, i.e., the treatment by an acid solution, by a treatment by a solution of a dealuminifying chemical compound such as, for example, those cited above, namely the silicon tetrachloride ($SiCl_4$), ammonium hexafluorosilicate [$(NH_4)_2SiF_6$], ethylenediaminetetraacetic acid (EDTA), as well as its mono- and disodium form.

In the preferred case where Y is Al, the dealuminification cycle of the framework, comprising at least one heat treatment stage, optionally and preferably carried out in the presence of water vapor, and at least one attack stage in acid medium of the zeolite, can be repeated as many times as necessary to obtain the dealuminified zeolite that has the desired characteristics. Likewise, following the heat treatment, optionally and preferably carried out in the presence of water vapor, several successive acid attacks, with acid solutions of different concentrations, can be performed.

A variant of this second calcination method can consist in carrying out the heat treatment of the porous composite material that contains the organic structuring agent at a temperature that is generally between 50 and 1000° C., optionally and preferably in the presence of water vapor. In this case, the stages for calcination of the organic structuring agent and for dealuminification of the framework are carried out simultaneously. Then, the porous composite material is optionally treated by at least one aqueous solution of a mineral acid (for example $HNO_3$ or HCl) or an organic acid ($CH_3CO_2H$, for example). Finally, the thus obtained solid optionally can be subjected to at least one ion exchange by at least one $NH_4NO_3$ solution so as to eliminate virtually the entire alkaline cation, in particular the sodium, present in a cationic position in the zeolite.

This invention also has as its object the preparation of a catalyst by using the porous composite material, obtained by the preparation process according to this invention, as a catalyst substrate. Said process for preparation of said catalyst comprises at least one stage that consists in impregnating said porous composite material with at least one metal that is selected from among the elements of groups VI and VIII of the periodic table and optionally at least one element that is selected from among those of the groups IIIA, IVA, VA, VB and VIIB. The selection of the metal depends essentially on the reaction in which the catalyst that is prepared according to the invention will be used.

The preparation of the catalyst according to the invention, after the preparation of the porous composite material in accordance with the two stages for preparation of the process described above, can be carried out by any method that is known to one skilled in the art. Following a possible calcination carried out at the end of stage 2) of the process for preparation of the material according to the invention and after optionally one or more ion exchange stages, for example with an $NH_4NO_3$ solution, and optionally after one or more dealuminification stages, at least one metal is introduced on said material, namely either primarily on the porous substrate or primarily on the zeolite crystals or else on the zeolite—porous substrate unit. The deposition of said metal on the porous composite material is advantageously carried out by the dry impregnation technique, the excess impregnation technique, or by ion exchange. When several metals are introduced, the latter can be introduced either all in the same way or by different techniques.

All of the precursors of the metals known by one skilled in the art are suitable for the deposition of one or more metal(s) on the material that is prepared according to the process of the invention in two stages described above. In particular, and without being limited, it is possible to use ammonia compounds, chlorides, bromides, or nitrates, polyketone complexes of metal, and hydrocarbyl metals such as alkyls, cycloalkyls, aryls, alkylaryls and arylalkyls that are metal. In the latter case, the introduction of the metal is advantageously carried out using a solution of the organometallic compound of said metal in an organic solvent. It is also possible to use organohalogenated compounds of metal.

The introduction of metal is preferably carried out by impregnation using an aqueous or organic solution of one of the metal compounds cited above. Among the organic solvents that can be used, it is possible to cite the paraffinic, naphthenic or aromatic hydrocarbons that contain, for example, 6 to 12 carbon atoms per molecule, and the halogenated organic compounds that contain, for example, 1 to 12 carbon atoms per molecule. It is possible to cite, for example, n-heptane, methylcyclohexane, toluene and chloroform. It is also possible to use mixtures of solvents.

The monitoring of certain parameters that are used during the deposition, in particular the nature of the precursor of the metal(s) used, makes it possible to orient the deposition of said metal(s) primarily on the porous substrate or on the zeolite crystals.

Thus, to introduce the metal(s) primarily on the porous substrate, it is possible to use an anion exchange in the presence of a competing agent, for example hydrochloric acid, whereby the deposition is generally followed by a calcination, for example at a temperature of between 350 and 550° C., and for a duration of between 1 and 4 hours.

It is also possible to consider depositing the metal(s) by cation exchange so that said metal(s) is (are) deposited primarily on the zeolite crystals.

The excess impregnation of metal on the porous composite material leads to the deposition of said metal both on the substrate and on the zeolite crystals.

Preferably, the excess impregnation technique will be used to promote a homogeneous deposition of metal on the porous composite material that is prepared according to the process of the invention in two stages described above: the macroscopic distribution coefficient of said metal(s), calculated from the distribution profile of said metal(s) determined by Castaing microprobe, is between 0.75 and 1.2, preferably between 0.85 and 1.15, and very preferably between 0.95 and 1.05. Said coefficient is defined as the ratio of concentrations of said metal(s) in the core of an extrudate or a ball of the catalyst relative to the edge of this same extrudate or this same ball according to the macroscopic form of said catalyst.

In addition, intermediate treatments, such as, for example, calcination and/or reduction, can be applied between the successive depositions of the different metals.

The preparation of the catalyst generally ends by calcination, usually at a temperature of between 250° C. and 600° C., for a duration of between 0.5 and 10 hours, preferably preceded by drying, for example in the oven, at a temperature that ranges from ambient temperature to 250° C., preferably from 40° C. to 200° C. Said drying stage is preferably conducted during the rise in temperature that is necessary to carry out said calcination. At the end of the calcination, a reduction under hydrogen is optionally initiated, generally at a temperature of between 300 and 600° C., preferably between 350° C. and 550° C., and for a duration of between 1 and 10 hour(s), preferably between 2 and 5 hours, so as to obtain said metal(s) primarily in the reduced form that is necessary to the catalytic activity.

In the case where the catalyst that is prepared according to this invention contains sulfur, the sulfur is introduced onto the calcined catalyst, containing the element(s) cited above, either in situ before the catalytic reaction, or ex situ. The sulfurization is carried out by using any sulfurizing agent that is well known to one skilled in the art, such as, for example, dimethyl disulfide or hydrogen sulfide. The optional sulfurization takes place after the reduction. In the case of an in situ sulfurization, the reduction, if the catalyst has not been previously reduced, takes place before the sulfurization. In the case of an ex situ sulfurization, the reduction and then the sulfurization are carried out.

This invention also has as its object the use of said porous composite material as a catalyst or as a catalyst substrate in hydrocarbon feedstock conversion reactions.

Said porous composite material advantageously finds its application in the reactions of isomerization, transalkylation and dismutation, alkylation and dealkylation, hydration and dehydration, oligomerization and polymerization, cyclization, aromatization, cracking, reforming, hydrogenation and dehydrogenation, oxidation, halogenation, hydrocracking, hydroconversion, hydrotreatment, hydrodesulfurization and hydrodenitrating, catalytic elimination of the nitrogen oxides, whereby said reactions involve feedstocks that comprise saturated and unsaturated aliphatic hydrocarbons, aromatic hydrocarbons, oxidized organic compounds, and organic compounds that contain nitrogen and/or sulfur as well as organic compounds that contain other functional groups.

By way of example, we will cite the following reactions:
The Isomerization of a Fraction that Contains at Least One Aromatic Compound with Eight Carbon Atoms Per Molecule:

The catalyst that is obtained from the porous composite material that is prepared according to the process of the invention contains, in addition to a porous substrate in the pores from which the zeolite crystals are dispersed, at least one metal from group VIII of the periodic table, preferably selected from the group that is formed by platinum and palladium, even more preferably platinum. Said catalyst optionally comprises at least one additional metal that is selected from among the metals of groups IIIA and IVA of the periodic table, preferably selected from among indium and tin, and said catalyst also advantageously comprises sulfur.

The catalyst that is obtained from the porous composite material that is prepared according to the process of the invention can be used in a process for isomerization of a fraction that contains at least one aromatic compound with eight carbon atoms per molecule, whereby said process comprises putting said aromatic fraction into contact with at least said catalyst that is obtained from the porous composite material that is prepared according to said process that is described above and is present in a catalytic reactor. Said aromatic fraction that contains at least one aromatic compound having eight carbon atoms per molecule comprises—in particular as an aromatic compound that has eight carbon atoms per molecule—either only a mixture of xylenes or only ethylenebenzene or a mixture of xylene(s) and ethylbenzene.

The catalyst that is used in the process for isomerization of the aromatic $C_8$ fractions according to this invention is advantageously in the form of balls or extrudates.

Said isomerization process is advantageously used according to the following operating conditions:
A temperature of between 300° C. and 500° C., preferably between 320° C. and 450° C., and even more preferably between 340° C. and 430° C.,
A partial hydrogen pressure of between 0.3 and 1.5 MPa, preferably between 0.4 and 1.2 MPa, and even preferably between 0.7 and 1.2 MPa,
A total pressure of between 0.45 and 1.9 MPa, preferably between 0.6 and 1.5 MPa,
A feed volumetric flow rate, expressed in kilogram of feedstock introduced per kilogram of catalyst and per hour, of between 0.25 and 30 $h^{-1}$, preferably between 1 and 10 $h^{-1}$, and even preferably between 2 and 6 $h^{-1}$.

Process for Hydrocracking and/or Hydroconversion or Hydrotreatment:

The porous composite material that is prepared according to the invention can advantageously be used as a catalyst substrate in a process for hydrocracking and/or hydroconversion as well as in a process for the hydrotreatment of hydrocarbon feedstocks that use the porous composite material according to the invention as a substrate.

In the case of the use of the composite material according to the invention as a catalyst substrate for hydrocracking or hydrotreatment, one or more elements of the group VIB, and optionally one or more elements of the group VIII by excluding platinum and palladium, and optionally one or more elements that are selected from among phosphorus, boron, and silicon, and optionally all or part of the elements of groups VB and VIIB optionally can be introduced in one or more stages by all of the methods that are known to one skilled in the art.

The process of hydrocracking and/or hydroconversion and the process of hydrotreatment according to the invention operate in the presence of hydrogen, at a temperature of more than 200° C., under a pressure of more than 1 MPa, whereby the volumetric flow rate is between 0.1 and 20 $h^{-1}$, and the quantity of hydrogen that is introduced is such that the volumetric ratio of liter of hydrogen/liter of hydrocarbon is between 80 and 5000 L/L.

The catalysts according to the invention can be used for the hydrotreatment of hydrocarbon feedstocks, whereby said hydrotreatment process can be placed by itself or upstream from a process of hydrocracking and/or hydroconversion on a hydrocracking catalyst based on zeolite and/or alumina-silica, preferably comprising nickel and tungsten.

Process for Reduction of the Pour Point:

The catalyst that is obtained from the porous composite material that is prepared according to the invention is used for the conversion of hydrocarbons and in particular in a process for reduction of the pour point as defined below.

In the case of the use of the composite material according to the invention as a catalyst substrate for reduction of the pour point, the catalyst contains at least one hydro-dehydrogenating element, for example a noble metal that is advantageously selected from the group that is formed by Pt or Pd or also a combination of at least one metal or compound of the group VI (for example molybdenum or tungsten) and at least one metal or compound of group VIII (for example nickel or cobalt). This can also be rhenium and/or niobium, taken by itself or combined with the elements of groups VIII and VI. This type of catalyst can advantageously contain phosphorus.

The feedstocks that can be treated according to the process of the invention are advantageously fractions that have relatively high pour points whose values it is desired to reduce.

The porous composite material that is prepared according to the invention can be used to treat varied feedstocks that range from relatively light fractions, such as kerosenes and jet fuels, up to feedstocks that have higher boiling points, such as middle distillates, vacuum residues, gas oils, middle distillates that are obtained from FCC (LCO and HCO), and hydrocracking residues.

The feedstock that is to be treated is in most cases a fraction $C_{10}^+$ with an initial boiling point that is greater than about 175° C., preferably a heavy fraction with a boiling point of at least 280° C. and advantageously with a boiling point of at least 380° C. The process that uses a catalyst that is obtained from the porous composite material that is prepared according to the invention is particularly suited for treating paraffinic distillates such as the middle distillates that encompass gas oils, kerosenes, jet fuels, vacuum distillates, and all other fractions whose pour point and viscosity should be suitable for returning to the framework of the specifications.

The feedstocks that can be treated can contain paraffins, olefins, naphthenes, aromatic compounds, and also heterocyclic compounds, and with a large proportion of n-paraffins of high molecular weight and very slightly branched paraffins that are also of high molecular weight.

The reaction is carried out in such a way that the ratio of cracking reactions is low enough to make the process economically viable. The ratio of cracking reactions is generally less than 40% by weight, preferably less than 30%, and advantageously 20%.

Typical feedstocks that can be treated generally have a pour point above 0° C. The products that result from the treatment have pour points that are less than 0° C. and preferably less than about −10° C.

These feedstocks have contents of n-paraffin and paraffins that are very slightly branched with more than 10 carbon atoms and with high molecular weight, often more than 30% and up to about 90%, and even in some cases more than 90% by weight. The process is particularly advantageous when this proportion is at least 60% by weight.

It is possible to cite as examples other feedstocks that can be treated according to the invention and in a nonlimiting manner: the bases for lubricating oils, the synthesis paraffins obtained from the Fischer-Tropsch process, the polyalpha-olefins with a high pour point, the synthesis oils, etc. The process can also be applied to other compounds that contain an n-alkane chain as defined above, for example n-alkylcycloalkane compounds, or that comprise at least one aromatic group.

The operating conditions under which the process is carried out are as follows:

The reaction temperature is between 170 and 500° C., and preferably between 180 and 470° C., advantageously 190-450° C.;

The pressure is between 1 and 250 bar, and preferably between 10 and 200 bar;

The hourly volumetric flow rate (vvh expressed in terms of injected feedstock volume per unit of volume of catalyst and per hour) is between about 0.05 and about 100, and preferably between about 0.1 and about 30 $h^{-1}$.

The contact between the feedstock and the catalyst is carried out in the presence of hydrogen. The level of hydrogen that is used and expressed in terms of liters of hydrogen per liter of feedstock is between 50 and about 2,000 liters of hydrogen per liter of feedstock and preferably between 100 and 1,500 liters of hydrogen per liter of feedstock.

The feedstock to be treated preferably has a content of nitrogen compounds that is less than about 200 ppm by weight and preferably less than 100 ppm by weight. The sulfur content is less than 1,000 ppm by weight, preferably less than 500 ppm, and even more preferably less than 200 ppm by weight. The metal content of the feedstock, such as Ni or V, is extremely reduced, i.e., less than 50 ppm by weight, preferably less than 10 ppm by weight, and even more preferably less than 2 ppm by weight.

The compounds that are obtained by the process can be monobranched, dibranched and multibranched with, advantageously, methyl groups.

Figure 1:
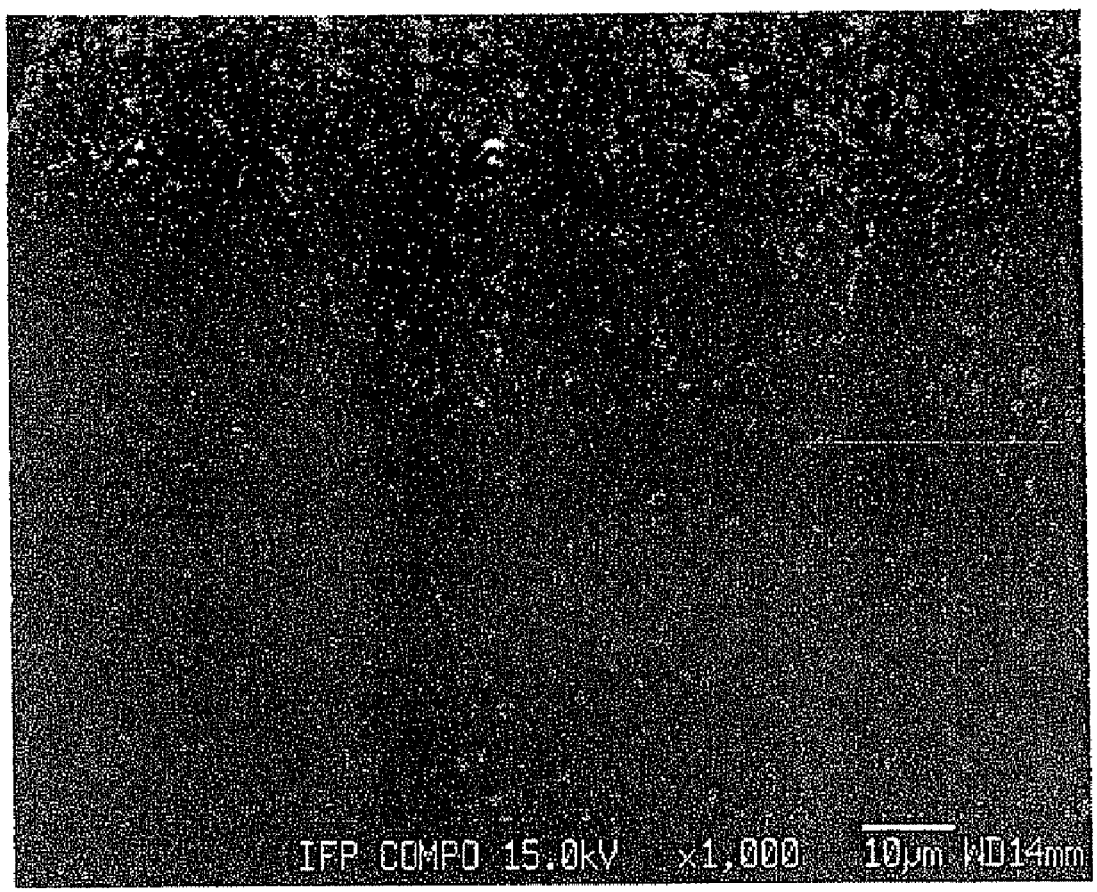
FIG. 1 shows an image by scanning electron microscopy and by transmission electron microscopy of the ZSM-5/alpha-alumina zeolite composite material that is recorded on a polished section by chemical contrast. The white or clear gray points correspond to the zeolitic particles, and the dark gray phase corresponds to the alpha-alumina substrate.

The following examples illustrate the invention, without thereby limiting its scope. The materials that are prepared in Examples 1 to 7 below are characterized by X-ray diffraction (Panalytical X'Pert), by scanning electron microscopy (JEOL JSM 6340), by Castaing microprobe (JEOL 8800R), by nitrogen physisorption (Micromeritics TriStar 3000), and by mercury porosimetry (Micromeritics Autopore IV).

EXAMPLES

Example 1

(Invention): Preparation of a Porous Composite Material C1 that Contains 10% by Mass of EU-1 Zeolite in an Alpha-Alumina Substrate Alpha-Alumina balls (Spheralite 512, Axens) with a diameter of 1.5 to 2.5 mm, a pore volume of 0.47 mL·g$^{-1}$, and a mean diameter of the pores of 200 nm are used as a porous substrate.

20 g of balls are impregnated in the dry state and at ambient temperature with an aqueous mixture of 6.4 g of tetraethoxysilane (TEOS, Aldrich) and 5.4 g of a 20% ammonia solution (Prolabo). The ammonia is used only to hydrolyze the TEOS and to form silica within the substrate. This impregnation is carried out in 2 stages. After each impregnation, the balls are dried at 100° C. to release the pore volume for the next impregnation.

An aqueous solution of hexamethonium hydroxide is prepared by allowing 8 g of hexamethonium bromide (Acros) to react with 6.1 g of silver oxide (Alfa Aesar) in 16 g of distilled water. This mixture is left to stir for one night in the absence of light. After the AgBr precipitate is separated by filtration, a solution at 25% by mass of hexamethonium hydroxide is recovered.

The balls are then impregnated in the dry state and at ambient temperature with a mixture of 4.4 g of the 25% hexamethonium hydroxide solution, 2.3 g of distilled water, and 0.15 g of sodium aluminate (Carlo Erba).

The impregnated balls then contain a mixture that has the following molar composition (apart from the substrate):
$SiO_2/Al_2O_3$: 40
$OH^-/SiO_2$: 0.2
$(Na+HM)/Al_2O_3$: 8.6; HM being hexamethonium
$HM/(Na+HM)$: 0.7
$H_2O/SiO_2$: 10

A fraction of the impregnated balls is then dried at 100° C. for one night and then analyzed by mercury porosimetry. The impregnated balls have a pore volume of 0.37 mL·g$^{-1}$ and a mean diameter of the macropores of 173 nm.

The remainder of the impregnated balls are transferred to a stainless steel substrate that is located in the central portion of a 100 ml stainless steel autoclave (Autoclave France) that contains 5 ml of distilled water at the bottom. The hydrothermal treatment is carried out for a period of 7 days at 180° C. by introducing the autoclave into a 50 L ventilated Binder oven. The product is recovered, washed with distilled water (500 ml), and dried at 100° C. It is then calcined under a flow of dry air at 550° C. for 18 hours. The porous composite material C1 is obtained.

An X-ray diffraction analysis of the product C1 shows a mixture of alpha-alumina phases and EU-1 zeolite. By nitrogen physisorption, a specific surface area of 43 m$^2$·g$^{-1}$ and a micropore volume of 0.01 mL·g$^{-1}$ are determined. 10% zeolite has then formed within alpha-alumina balls. The distribution coefficient of the silicon relative to the aluminum that is determined using the Castaing microprobe is 1.02. A SEM analysis that is carried out on a polished section of the composite substrate shows zeolitic particles of a mean size of 5 µm. By X mapping, it is possible to see that these zeolitic particles are composed of composite agglomerates of zeolite crystals and alpha-alumina particles.

Example 2

(Invention): Preparation of a Porous Composite Material C2 that Contains 10% by Mass of ZSM-5 Zeolite in an Alpha-Alumina Substrate Alpha-alumina balls that are identical to the ones that are described in Example 1 are used as a porous substrate. 20 g of these alpha-alumina balls are impregnated with tetraethoxysilane (TEOS) and ammonia as in Example 1. They are then impregnated with an aqueous solution that contains 5.3 g of an aqueous solution of 1 M tetrapropylammonium hydroxide (Aldrich), 0.92 g of distilled water, and 0.15 g of sodium aluminate (Carlo Erba).

The impregnated balls then contain a phase that has the following molar composition (apart from the substrate):
$SiO_2/Al_2O_3$: 40
$OH^-/SiO_2$: 0.23
TPAOH/(Na+TPAOH): 0.7; TPAOH being the tetrapropylammonium hydroxide
$H_2O/SiO_2$: 9

A fraction of the impregnated balls is then dried at 100° C. for one night and then analyzed by mercury porosimetry. The impregnated balls have a pore volume of 0.37 mL·g$^{-1}$ and a mean diameter of the macropores of 182 nm.

The remainder of the impregnated balls are transferred to a stainless steel substrate that is located in the central portion of a 100 ml stainless steel autoclave (Autoclave France) with 5 ml of distilled water at the bottom. The hydrothermal treatment is carried out for a period of 6 days at 180° C. by introduction of the autoclave into a 50 L ventilated Binder oven. The product is recovered, washed with distilled water (500 ml), and dried at 100° C. It is then calcined under a flow of dry air at 550° C. for 18 hours. The porous composite material C2 is obtained.

An X-ray diffraction analysis of the product C2 shows a mixture of alpha-alumina phases and ZSM-5 zeolite. By nitrogen physisorption, a specific surface area of 41 m$^2$·g$^{-1}$ and a micropore volume of 0.01 mL·g$^{-1}$ are determined. 10% zeolite has then formed within alpha-alumina balls. The distribution coefficient of the silicon relative to the aluminum that is determined using the Castaing microprobe is 1.03. A SEM analysis that is carried out on a polished section of the composite substrate shows zeolitic particles of a mean size of 1 µm. By X mapping, it is possible to see (FIG. 1) that these zeolitic particles are composed of composite agglomerates of zeolite crystals and particles of alpha-alumina.

Example 3

(Invention): Preparation of a Porous Composite Material C3 that Contains 10% by Mass of Y Zeolite in an Alpha-Alumina Substrate A precursor mixture that is suited to obtaining the FAU zeolite is prepared. To do this, 8.65 g of NaOH (Fluka) and then 4.10 g of sodium aluminate are dissolved in 48.3 g of distilled water. This aluminum source solution is kept under cold conditions to stabilize it at 5° C. 38.9 g of sodium silicate solution that is kept under cold conditions is taken to stabilize it at 5° C.

For preparation of the contact of the porous substrate with the mixture of precursors, the aluminum and silicon sources are combined in a synthesis medium that is cryostatically kept at 5° C. The mixture is homogenized by stirring, 300 rpm, for 5 minutes. After the stirring is stopped, 20 g of alpha-alumina balls that are identical to those that are described in Example 1 are immersed in the medium. A vacuum of 0.4 mbar is applied for 30 minutes to expel any air therein through the porosity of the substrate and to allow the still-liquid precursor to enter into the pores of the balls.

One and one-half hours after the silicon and aluminum sources are combined, the reaction medium has gelled and caked inside and outside of the balls to form a very cohesive gel that occupies the entire volume of the balls, without a liquid supernatant.

The balls are extracted from the reaction medium, and excess gel is removed at its surface. The impregnated balls than contain a phase that has the following molar composition (apart from the substrate):

$SiO_2/Al_2O_3$: 7
$Na_2O/SiO_2$: 0.85
$H_2O/Na_2O$: 28

A fraction of the impregnated balls is then dried at 100° C. for one night and then analyzed by mercury porosimetry. The impregnated balls have a pore volume of 0.39 mL·$g^{-1}$ and a mean diameter of the macropores of 154 nm.

The remainder of the impregnated balls are transferred to a stainless steel substrate that is located in the central portion of a 100 ml stainless steel autoclave (Autoclave France) with 5 ml of distilled water at the bottom. The hydrothermal treatment is carried out for a period of 1 day at 180° C. by introduction of the autoclave into a 50 L ventilated Binder oven. The product is recovered, washed with distilled water (500 ml), and dried at 100° C. The porous composite material C3 is obtained.

Figure 2:
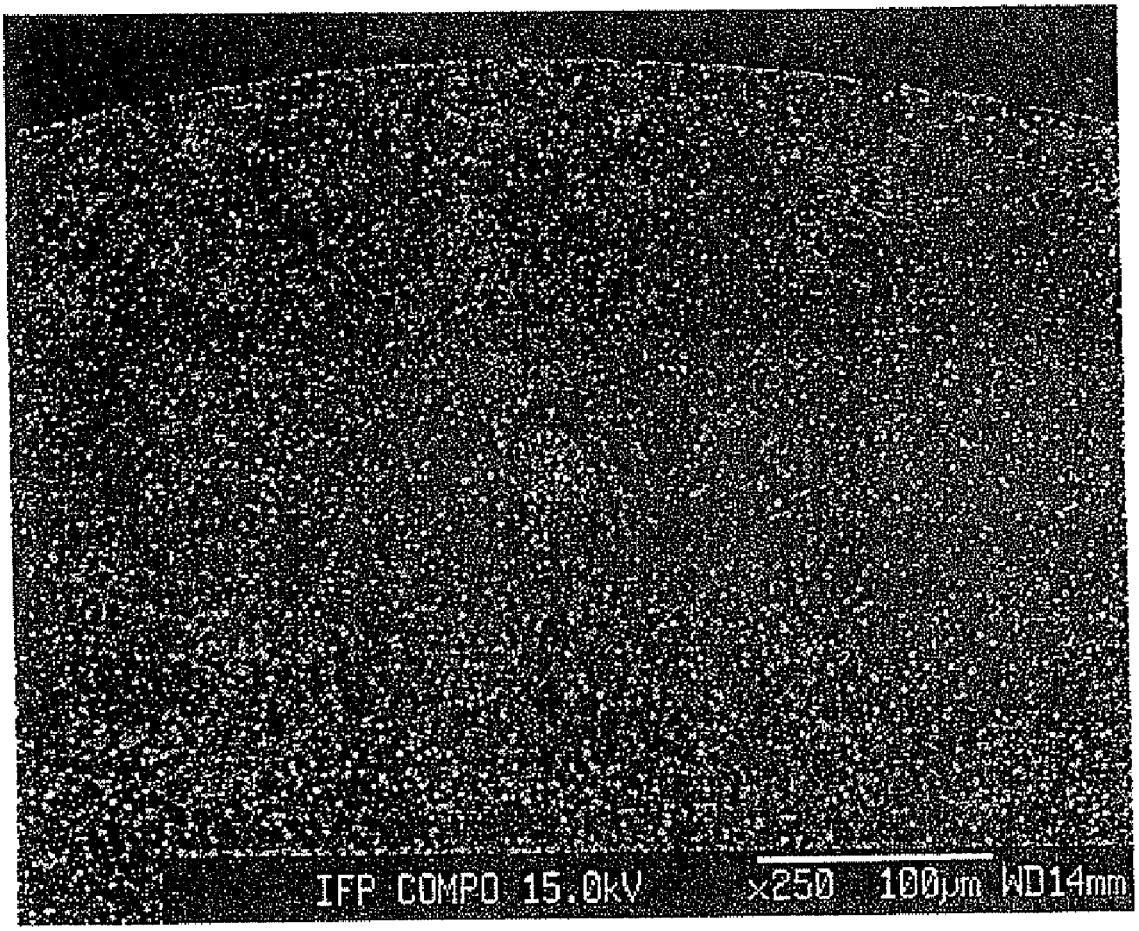
FIG. 2 shows an image by scanning electron microscopy and by transmission electron microscopy of the Y zeolite/alpha-alumina composite material that is recorded on a polished section by chemical contrast. The white or clear gray points correspond to the zeolitic particles, and the dark gray phase corresponds to the alpha-alumina substrate.

An X-ray diffraction analysis of the product C3 shows a mixture of alpha-alumina phases and Y-zeolite. By nitrogen physisorption, a specific surface area of 53 $m^2 \cdot g^{-1}$ and a micropore volume of 0.03 mL·$g^{-1}$ are determined. 10% zeolite has then formed within alpha-alumina balls. The distribution coefficient of silicon relative to the aluminum that is determined using the Castaing microprobe is 1.02. A SEM analysis that is carried out on a polished section of the composite substrate shows zeolitic particles of a mean size of approximately 1 μm. By X mapping, it is possible to see (FIG. 2) that theses zeolitic particles are composed of composite agglomerates of zeolite crystals and alpha-alumina particles.

Example 4

(Invention): Preparation of a Porous Composite Material C4 that Contains 10% by Mass of EU-2 Zeolite in an Alpha-Alumina Substrate Alpha-alumina balls are impregnated according to the procedure that is described in Example 1, so that they contain a phase that has the following molar composition (apart from the substrate):

$SiO_2/Al_2O_3$: 200
Off/$SiO_2$: 0.4
(Na+HM)/$Al_2O_3$: 18; HM being hexamethonium
HM/(Na+HM): 0.3
$H_2O/SiO_2$: 9

A fraction of the impregnated balls is then dried at 100° C. for one night and then analyzed by mercury porosimetry. The impregnated balls have a pore volume of 0.36 mL·$g^{-1}$ and a mean diameter of the macropores of 175 nm.

The remainder of the impregnated balls are transferred to a stainless steel substrate that is located in the central portion of a 100 ml stainless steel autoclave (Autoclave France) with 5 ml of distilled water at the bottom. The hydrothermal treatment is carried out for a period of 7 days at 180° C. by introducing the autoclave into a 50 L ventilated Binder oven. The product is recovered, washed with distilled water (500 ml), and dried at 100° C. It is then calcined under a flow of dry air at 550° C. for 18 hours. The porous composite material C4 is obtained.

An X-ray diffraction analysis of the product C4 shows a mixture of alpha-alumina phases and EU-2 zeolite. By nitrogen physisorption, a specific surface area of 42 $m^2 \cdot g^{-1}$ and a micropore volume of 0.01 mL·$g^{-1}$ are determined. 10% zeolite has then formed within alpha-alumina balls. The distribution coefficient of silicon relative to the aluminum that is determined using the Castaing microprobe is 1.04. A SEM analysis that is carried out on a polished section of the composite substrate shows zeolitic particles of a mean size of 5 μm. By X mapping, it is possible to see that these zeolitic particles are composed of composite agglomerates of zeolite crystals and alpha-alumina particles.

Example 5

Preparation of the Protonated Form of the Porous Composite Materials C1 to C4

The materials C1 to C4 that are prepared according to Examples 1 to 5 are subjected to 3 ion exchanges in a 10N $NH_4NO_3$ solution at 100° C. for 4 hours for putting the supported zeolites in $NH_4^+$ form. The solids are finally dried at 120° C. for 12 hours and calcined under air at 500° C. for 1 hour to obtain the protonic forms of zeolites that are contained in the materials C1 to C4.

The HY zeolite/alpha-alumina porous composite material (material C4) that is thus prepared is subjected to vapor treatment under a mixture of 50% by volume of water vapor in air at 650° C. for 4 hours. The material is then subjected to an acid reflux attack for 4 hours by using an $HNO_3$ solution with a 4N concentration, and then rinsed with distilled water. This material is finally calcined under a flow of dry air at 500° C. for 1 hour.

Example 6

(For Comparison): Preparation by Shaping of Catalysts M1 to M4 Containing 10% Zeolite Mixtures of zeolite precursors are prepared by using the same molar compositions as in Examples 1 to 4. A mixture of tetraethoxysilane and ammonia is prepared. Then, an aqueous solution that is prepared by mixing distilled water, organic structuring agent and sodium aluminate is added to this first mixture. The whole mixture is subjected to hydrothermal treatment under the same conditions that are described in Examples 1 to 4. Calcined zeolite powders of the same nature and with crystals of a similar size as in these examples are then recovered.

The zeolite powders are then subjected to 3 ion exchanges in a 10N $NH_4NO_3$ solution at 100° C. for 4 hours. After ion exchange, the supported zeolites are in $NH_4^+$ form. The solids are finally dried at 120° C. for 12 hours and calcined under a flow of dry air at 500° C. for 1 hour.

The thus prepared HY zeolite (material M4) is subjected to vapor treatment under a mixture of 50% by volume of water vapor in air at 650° C. for 4 hours. This zeolite is then subjected to an acid reflux attack for 4 hours by using an $HNO_3$ solution with a 4N concentration, and then rinsed with distilled water. This zeolite is finally calcined under a dry air flow at 500° C. for 1 hour.

The zeolite powders are then shaped by mixing with a boehmite gel. After extrusion and calcination, the materials M1 to M4 are obtained in the form of extrudates of gamma-alumina with a mean diameter of 1.6 mm and a zeolite content of 10% by mass.

Example 7

Preparation of Bifunctional Catalysts A and B for the Isomerization of the Aromatic C8 Fractions 0.5% Pt Catalyst/Composite Material C1: Catalyst A, according to the invention.

The porous composite material C1, whose preparation is described in Examples 1 and 5, is subjected to an anion exchange with hexachloroplatinic acid in the presence of a competing agent (hydrochloric acid), so as to deposit 0.5% by weight of platinum relative to the catalyst. The moist solid is then dried at 120° C. for 12 hours and calcined under a flow of dry air at the temperature of 500° C. for one hour.

The thus obtained catalyst contains 9.9% by weight of EU-1 zeolite in hydrogen form, 89.4% by weight of alumina, and 0.5% by weight of platinum. The dispersion of platinum, measured by oxygen chemisorption, is 78%, and the distribution coefficient of platinum that is determined by Castaing microprobe is 0.95.

0.5% Pt Catalyst/Material M1: Catalyst B, not according to the invention.

The material M1, whose preparation is described in Example 6, is subjected to an anion exchange with hexachloroplatinic acid in the presence of a competing agent (hydrochloric acid) so as to deposit 0.5% by weight of platinum relative to the catalyst. The moist solid is then dried at 120° C. for 12 hours and calcined under a flow of dry air at the temperature of 500° C. for one hour.

The thus obtained catalyst contains 9.9% by weight of EU-1 zeolite in hydrogen form, 89.4% by weight of alumina, and 0.5% by weight of platinum. The dispersion of platinum, measured by oxygen chemisorption, is 85%, and the distribution coefficient of the platinum that is determined by Castaing microprobe is 0.92.

Example 8

Isomerization of an Aromatic C8 Synthetic Fraction Using Catalysts A and B

The performance levels of the catalysts A and B were evaluated in the isomerization of an aromatic fraction that comprises aromatic compounds with 8 carbon atoms per molecule, primarily metaxylene, orthoxylene, and ethylbenzene. The operating conditions that are used are:
Temperature=390° C.,
Pressure=15 bar,
$H_2$ Partial Pressure=12 bar The catalysts are treated in advance with a feedstock that contains dimethyl disulfide (DMDS) in the presence of hydrogen, with a concentration such that the atomic ratio of sulfur to metal is 1.5. The catalysts are then kept for 3 hours at 400° C. under a flow of hydrogen, and then the feedstock is injected.

The catalysts have been compared in terms of activity by the conversion of ethylbenzene and the equilibrium approach for paraxylene (pX), and in terms of selectivity by the iso-approach net losses at the equilibrium of pX. The equilibrium approach (AEQ) is defined in the following manner for pX:

$$pX\, AEQ(\%) = 100 \times (\%\, pX_{\textit{effluent}} - \%\, pX_{\textit{feedstock}})/(\%\, pX_{\textit{equilibrium}} - \%\, pX_{\textit{feedstock}})$$

The isomerization reaction leads to parasitic reactions that generate three types of losses: the losses to paraffins that result essentially from reactions for opening naphthene rings, followed by cracking, losses to aromatic compounds that are formed by the reactions of dismutation and transalkylation of the aromatic compounds with 8 carbon atoms (AC8), and finally the losses to naphthenes including naphthenes with 8 carbon atoms (N8) due to the hydrogenation of the aromatic compounds. Whereby the N8 can be recycled, the losses by cracking and dismutation/transalkylation including the naphthenes other than N8 (whose sum constitutes the net losses) will be compared.

The losses by cracking (P1) are losses of AC8 in the form of paraffins (PAR) that have one to eight carbon atoms:

$$P1(\%\text{ by weight}) = 100 \times [(\%\, PAR_{\textit{effluent}} \times \text{weight of effluent}) - (\%\, PAR_{\textit{feedstock}} \times \text{weight of feedstock})]/(\%\, AC8_{\textit{feedstock}} \times \text{weight of feedstock})$$

The losses by dismutation/transalkylation (P2) are losses of AC8 in the form of naphthenes other than N8, toluene, benzene and C9+ aromatic compounds (OAN):

$$P2(\%\text{ by weight}) = 100 \times [(\%\, OAN_{\textit{effluent}} + \text{weight of effluent}) - (\%\, OAN_{\textit{feedstock}} \times \text{weight of feedstock})]/(\%\, AC8_{\textit{feedstock}} \times \text{weight of feedstock})$$

The sum of the losses P1 and P2 represents the net losses.
The data that are presented in Table 1 have been obtained under experimental iso-conditions.

TABLE 1

Results Obtained under Experimental Iso-Conditions

| Catalyst | A (According to the Invention) | B (Not According to the Invention) |
|---|---|---|
| pX AEQ (%) | 97.0 | 94.0 |
| EB Conversion (%) | 55.0 | 53.2 |
| Net Losses (% by Weight) | 5.5 | 4.5 |

It is noted that according to the results of Table 1, the catalyst A, according to the invention, is more active than the catalyst B, not according to the invention, since it leads to operating iso-conditions at a pX AEQ of 97.0% (against 94.0% for the catalyst B) and a conversion of EB of 55% (against 53.2% for the catalyst B).

The catalysts have also been compared to iso AEQ pX by varying the PPH. The results are provided in Table 2. It is possible to note that the catalyst A, according to the invention, is as selective as the catalyst B, not according to the invention.

TABLE 2

Results Obtained under Iso AEQ pX

| Catalyst | A (According to the Invention) | B (Not According to the Invention) |
|---|---|---|
| pX AEQ (%) | 94.5 | 94.0 |
| EB Conversion (%) | 53.5 | 53.2 |
| Net Losses (% by Weight) | 4.6 | 4.5 |

Example 9

Preparation of the Bifunctional Catalysts C and D for Hydrocracking 7.0% Ni Catalyst/1.4 Mo/Material C3: Catalyst C, According to the Invention.
6.9% Ni Catalyst/1.3 Mo/Material M3: Catalyst D, Not According to the Invention.

The composite materials C3 and M3, whose preparations are described in Examples 3, 5 and 6, are impregnated in the dry state by a solution of a mixture of ammonium heptamolybdate and nickel nitrate, and then calcined under air at 550° C. in situ in the reactor. The contents by weight of oxides of the NiMo—C4 and NiMo-M4 catalysts obtained in $MoO_3$ and NiO phases are 7.0/1.4 and 6.9/1.3, respectively.

Example 10

Hydrocracking Using Bifunctional Catalysts C and D

The catalysts C and D are used under the conditions of hydrocracking with high conversion (60-100%). The petroleum feedstock is a hydrotreated vacuum distillate whose primary characteristics are provided in Table 3.

TABLE 3

Characteristic of the Feedstock that is Used.

| | |
|---|---|
| Density (20/4) | 0.869 |
| Sulfur (ppm by Weight) | 502 |
| Nitrogen (ppm by Weight) | 10 |
| Simulated Distillation | |
| Initial Point | 298° C. |
| 10% Point | 369° C. |
| 50% Point | 427° C. |
| 90% Point | 481° C. |
| Final Point | 538° C. |

This feedstock has been obtained by hydrotreatment of a vacuum distillate on an HRK558 catalyst sold by the Axens Company comprising an element from the group VIB and an element from the group VIII deposited on alumina.

0.6% by weight of aniline and 2% by weight of dimethyl disulfide are added to the feedstock so as to simulate the partial pressures of $H_2S$ and $NH_3$ that are present in the second hydrocracking stage. The thus prepared feedstock is injected into the hydrocracking test unit, which comprises a fixed-bed reactor, with upward circulation of the feedstock ("up-flow"), into which is introduced 10 ml of catalyst. The catalyst is sulfurized by a mixture of n-hexane/DMDS+aniline up to 320° C. We note that any in-situ or ex-situ sulfurization method is suitable. Once the sulfurization is completed, the feedstock that is described in Table 3 can be transformed. The operating conditions of the test unit are provided in Table 4.

TABLE 4

Catalyst Test Conditions.

| | |
|---|---|
| Total Pressure | 9 MPa |
| Catalyst | 10 $cm^3$ |
| Temperature | 360-420° C. |
| Hydrogen Flow Rate | 10 L/h |
| Feedstock Flow Rate | 10 $cm^3/h$ |

The catalytic performance levels are expressed by the middle distillate yield obtained in the crude isoconversion of 70% by weight in a 380° C. fraction less, with "380° C. less" representing the fraction, distilled at a temperature that is less than or equal to 380° C. The catalytic performance levels are measured on the catalyst after a stabilization period, generally at least 48 hours, has elapsed.

The gasoline yield (27-150) is equal to the % by weight of compounds that have a boiling point that is between 27 and 150° C. in the effluents. The middle distillate yield (fraction 150-380) is equal to the % by weight of compounds that have a boiling point of between 150 and 380° C. in the effluents.

The reaction temperature is set so as to ensure a crude conversion CB that is equal to 70% by weight. In Table 5 below, we have yields of gasoline and middle distillate for the catalysts that are described in the examples above.

TABLE 5

Catalytic Activities of the Hydrocracking Catalysts.

| Catalyst | Gasoline Yield (% by Weight) | Middle Distillate Yield (% by Weight) |
|---|---|---|
| C | 29.7 | 34.3 |
| D | 27.5 | 31.1 |

Table 5 demonstrates that catalyst C containing the NiMo—C4 composite prepared according to the process of the invention and used in a DSV hydrocracking process reaches, at a conversion level of 70% by weight, gasoline and DM yields that are higher than those observed on the catalyst D (NiMo-M4) prepared conventionally, thus showing the advantage of the new method for preparation according to the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application Ser. No. 08/04.608, filed Aug. 14, 2008.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Porous composite material that comprises a porous substrate based on a refractory inorganic oxide that is selected from among alpha-alumina, theta-alumina, cordierite, magnesium oxide, zirconia, titanium oxide or mixtures of these oxides, whereby said substrate has a mean diameter of the pores of between 20 nm and 750 nm, in which said substrate has a zeolite crystal content that is less than 15% by mass, whereby said crystals are dispersed homogeneously in the pores of said substrate, whereby the distribution coefficient of the framework elements X and Y of the zeolite, where X represents silicon and/or germanium and Y represents at least one element that is selected from among aluminum, iron, gallium, and boron, measured by Castaing microprobe, is between 0.75 and 1.25, and in which the total pore volume of said final composite material represents at least 40% of the initial total pore volume of the substrate, and the mean diameter of the pores of said composite material represents at least 50% of the mean diameter of the pores of the initial substrate.

2. Material according to claim 1, in which the content of zeolite crystals is in the range of about 10% to less than 15% by mass.

3. Material according to claim 1, in which the distribution coefficient that is measured by Castaing microprobe is between 0.95 and 1.05.

4. Material according to claim 1, in which the total pore volume of said final composite material represents at least 70% of the initial total pore volume of the substrate.

5. Material according to claim 1, in which X is silicon and Y is aluminum.

6. Process for preparation of a porous composite material according to claim 1, comprising at least the following stages;
   1) The impregnation of a porous substrate based on a refractory inorganic oxide that is selected from among alpha-alumina, theta-alumina, cordierite, magnesium oxide, zirconia, titanium oxide, or mixtures of these oxides, whereby said substrate has a mean pore diameter of between 20 nm and 750 nm, with a mixture of zeolitic precursors comprising one or more sources of framework elements X and Y, where X represents silicon and/or germanium, and Y represents at least one element that is selected from among aluminum, iron, gallium, and boron, as well as a mineralizing agent and a structuring agent, until the pore volume of the impregnated and anhydrous substrate represents at least 40% of the initial pore volume of the substrate, and the mean diameter of the pores is at least 50% of the mean diameter of the pores of the initial substrate,
   2) Hydrothermal treatment of the impregnated substrate that is obtained from stage 1) that makes possible the crystallization of the zeolite in the pores of said substrate, without additional supply of said framework elements X and Y, so that said substrate has a zeolitic crystal content that is less than 15% by mass.

7. Process for preparation according to claim 6, in which the impregnation is carried out at ambient temperature or under cold conditions.

8. Process for preparation according to claim 6, in which drying of said impregnated substrate that is obtained from stage 1) is used, whereby said drying is carried out at a temperature that is lower than 200° C.

9. Process for preparation according to claim 6, in which the zeolite precursors are selected from among precursors of the beta-zeolite of the BEA-structural type, the EU-1 zeolite of the EUO-structural type, the EU-2 zeolite, the NaX and NaY zeolites of the FAU-structural type, the ZSM-5 zeolite of the MFI-structural type, and the ZSM-22 zeolite of the TON-structural type.

10. Process for preparation according to claim 6, in which said mineralizing agent is selected from among hydroxide and fluoride ions.

11. Process for preparation according to claim 6, in which said structuring agent is a cation M and/or an organic compound Q.

12. Process for preparation according to claim 6, in which the impregnated substrate that is obtained from stage 1) is immersed in a solvent, whereby said solvent is selected from among distilled water and an aqueous solution of at least one of an organic structuring agent Q or an alkaline cation M, or an organic solvent.

13. Process for preparation according to claim 12, in which said solvent that contains the substrate is then transferred into an autoclave and is treated under autogenous pressure at a temperature that is between 25 and 250° C. for 1 hour to several months.

14. Process for preparation according to claim 6, in which the hydrothermal treatment comprises transferring the impregnated substrate is obtained from said stage 1) to a stainless steel substrate that is located in an autoclave at the bottom of which is introduced a liquid, whereby said liquid is distilled water or at least one volatile organic structuring agents Q or an aqueous mixture of said at least one volatile structuring agent.

15. Process for preparation according to claim 14, in which said impregnated substrate that is obtained from stage 1) is then subjected to hydrothermal treatment under autogenous pressure at a temperature of between 25 and 250° C. for 1 hour to several months.

16. A material according claim 1 in which the content of zeolite crystals is about 10% by mass.

* * * * *